Sept. 16, 1930. W. W. McCARROLL 1,775,963
PLANING MACHINE
Filed Nov. 27, 1928 3 Sheets-Sheet 1
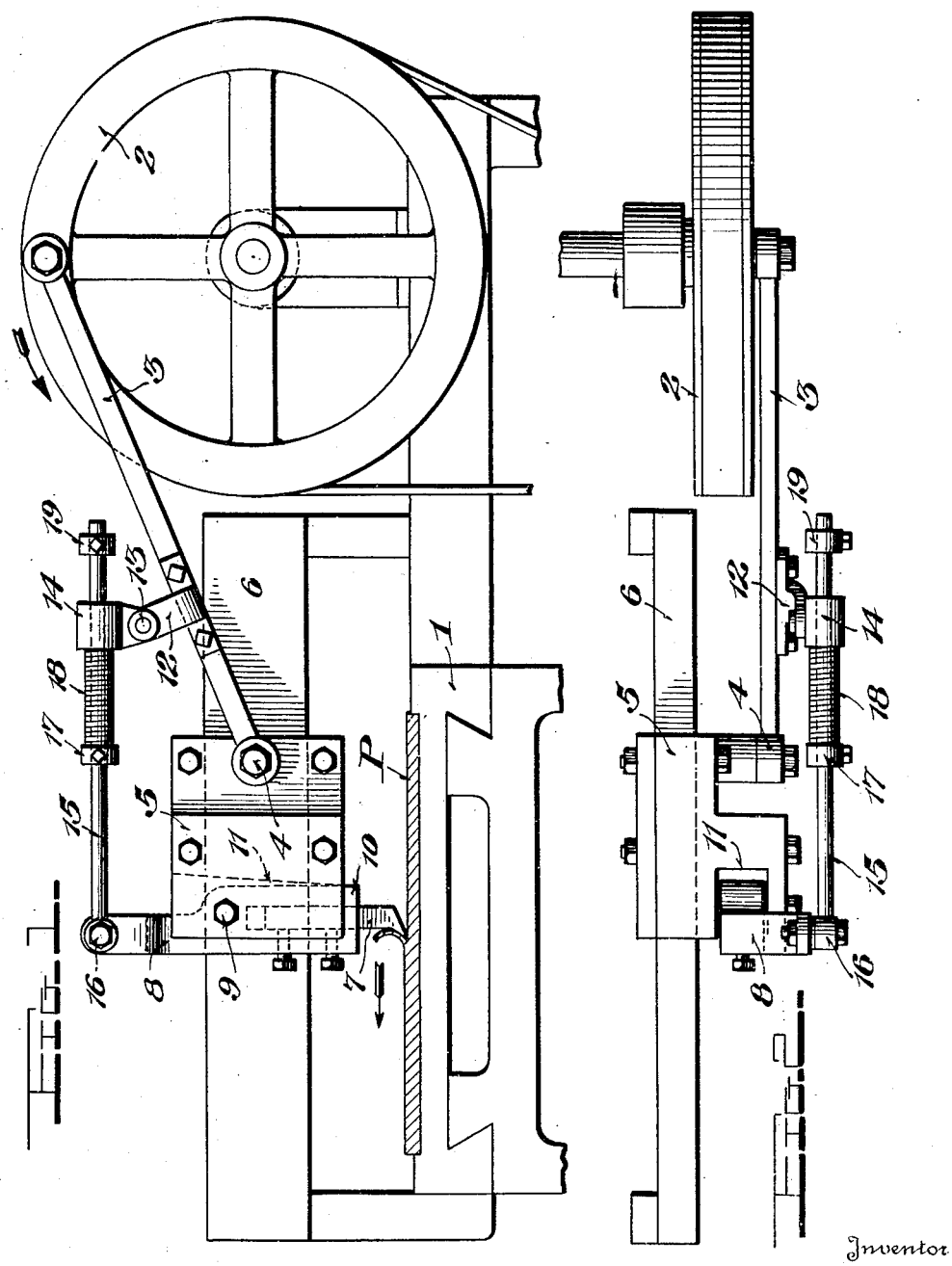

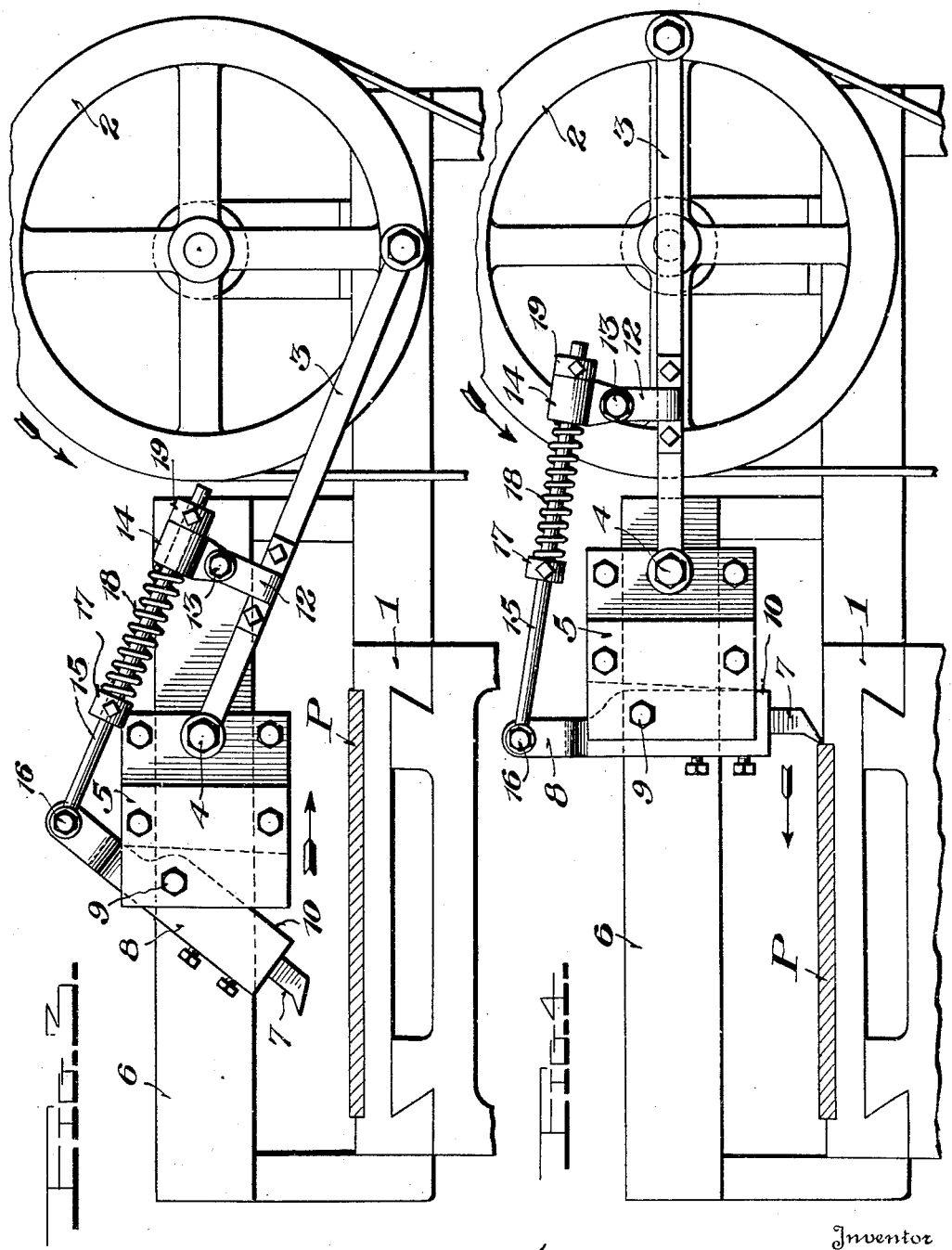

Sept. 16, 1930. W. W. McCARROLL 1,775,963
PLANING MACHINE
Filed Nov. 27, 1928 3 Sheets-Sheet 3
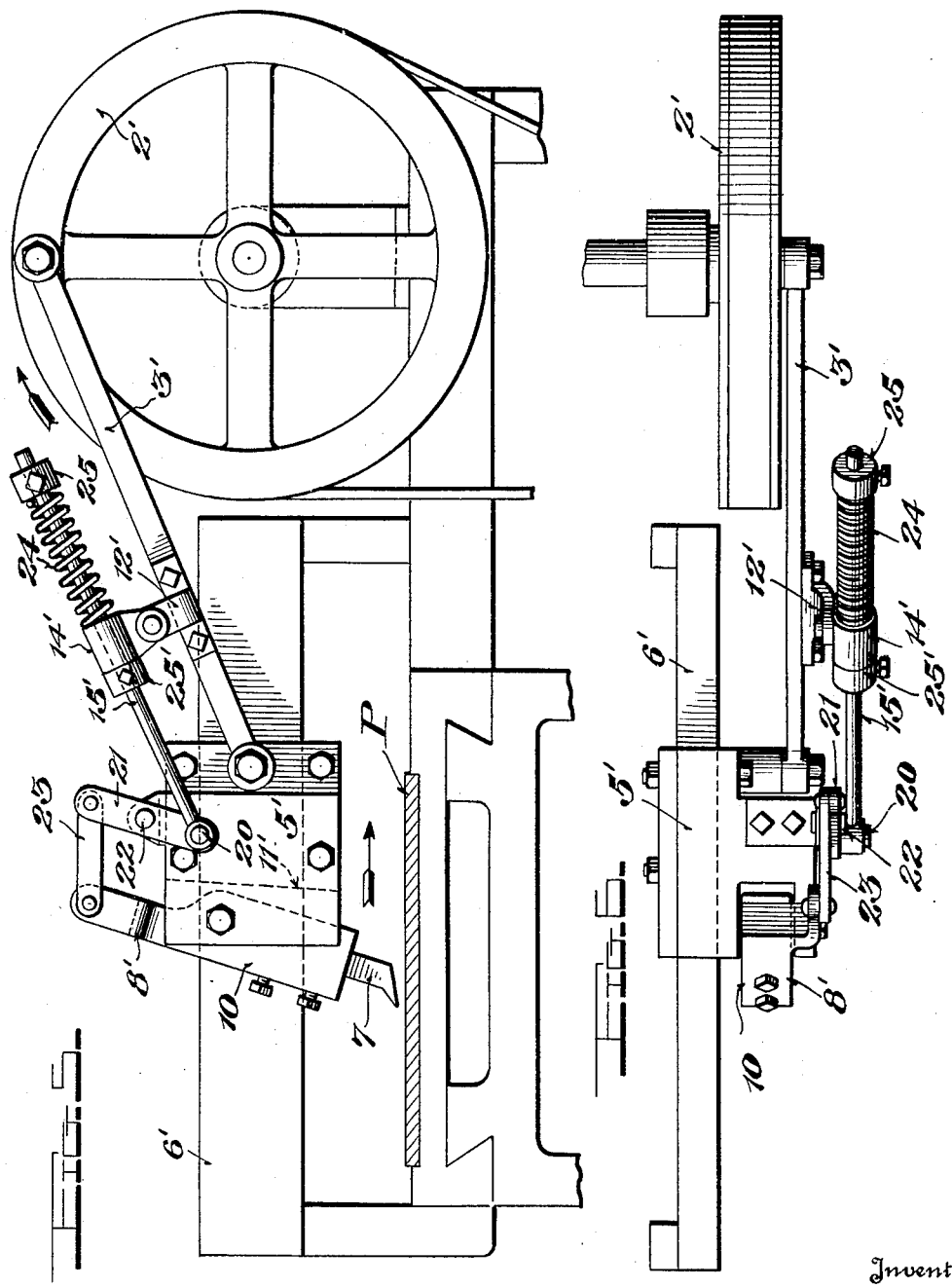

Patented Sept. 16, 1930

1,775,963

UNITED STATES PATENT OFFICE

WALKER W. McCARROLL, OF NEW HAVEN, CONNECTICUT

PLANING MACHINE

Application filed November 27, 1928. Serial No. 322,206.

This invention relates to planing machines and pertains more particularly to machines of this character employed in roughing of planing electrotype plates and the like.

The primary object of the invention is to provide improved means for clearing the plate of the cutting tool during idling or retrograde movement of the latter, thereby to eliminate dragging of the tool over the plate and consequent injury to or spoiling of the plate.

Heretofore it has been customary to provide a resilient mounting for the tool which during idling stroke thereof gives sufficiently to permit the tool to drag over the plate, but this has proven objectionable, since the tool being maintained under tension chatters and nicks the plate, the nicking causing chips which result from the removal of the nicks by the tool on its working stroke. These chips accumulate and find their way beneath the rollers which hold the plate onto the bed, with the result that the rollers cannot hold the plate uniformly or truly parallel to and on the bed, so that the tool cuts deeper into the high points of the plate than into the low points thereof, and may even jam the machine with consequent damage thereto as well as destruction of the plate.

The present invention aims to eliminate the foregoing objections and thereby to increase the life and effectiveness of the cutting tool.

In the drawings:—

Fig. 1 is a side elevation of the invention, the plate being shown in section;

Fig. 2 is a top plan view;

Fig. 3 is a view similar to Fig. 1, but showing the parts on the idling stroke of the tool;

Fig. 4 is a view similar to Fig. 1, showing the parts at the commencement of the working stroke;

Fig. 5 is a view similar to Fig. 1 of a modified form of the invention, and

Fig. 6 is a top plan view of Fig. 5.

In proceeding in accordance with the present invention, 1 indicates the movable bed or table of the machine upon which the plate P is mounted. A drive wheel 2 has an eccentric rod or link 3 connected thereto, the latter being pivoted at 4 to a tool carrier or head 5 which is slidably mounted on a horizontal track or guide 6 that is mounted above the table 1.

A cutting tool 7 is rigidly secured in a holder 8 which latter is pivoted between its ends at 9 to the carrier 5. The rear side 10 of the holder is formed to abut a wall 11 on the working stroke of the tool thereby to hold the latter firm and rigid.

A yoke 12 is mounted on the rod 3 between the ends thereof and is pivoted at 13 to a guide 14 which is slidably mounted on a rod 15. The rod 15 is pivoted at 16 to the upper end of the holder 8 and at its rear is supported by the guide 14. A stop collar 17 is mounted on the rod 15 and is abutted by a coil spring 18 encircling rod 15, the opposite end of which spring abuts the guide 14. A similar stop collar 19 is secured to the rod 15 so as to engage the guide 14 when the parts are in the position of Fig. 4.

In operation, and as depicted in Fig. 1, on the working stroke of the tool, the rod 3 moves the carrier 5 forwardly, and the spring 18 becomes compressed as shown in Fig. 1, causing the tool holder to be held against the wall 11 of the carried 5. As the rod 3 moves forwardly, as shown in Fig. 1, the spring is fully compressed, thereby effecting rigid and firm holding of the cutting tool. Upon the idling or retrograde movement of the carrier 5, as shown in Fig. 3, the rod 3 moves rearwardly causing corresponding movement of the carrier 5 and therewith the tool holder and at the same time movement of the holder about its pivot, due to guide 14 engaging collar 19 and moving rod 15 rearwardly thereby effecting raising of the tool up from the plate P leaving free space between the two, so that there is no contact whatever between the plate and tool.

In Figs. 1 to 4 of the invention, the drive wheel 2 rotates counter-clockwise, while in the modified form of Figs. 5 and 6, the drive wheel 2' moves clockwise. In the latter form of the invention, the rod or link 3' is pivoted to the head 5', which latter is slidable on the guide 6'. The tool carrier 8' is pivoted to the carrier, while the yoke 12' is pivoted to a guide 14' that slides on a rod 15', all of which parts are common to the form of the invention in Figs. 1 to 4. The rod 15', however, is pivoted at 20 to the lower end of a lever 21 which latter is pivoted between its ends at 22 to the carrier 5'. A link 23 is pivoted to the upper end of the lever 21 and to the upper end of the tool carrier 8'. A coil spring 24 encircles rod 15', and at one end abuts guide 14', while its opposite end abuts a stop collar 25 mounted on the rod. A second collar 25' is rigidly secured to rod 15' and is engageable with the front end of guide 14'.

In operation, of the modified form of the invention, it will be noted that upon idling or retrograde movement of the tool carrier, the rod 3' moves rearwardly and effects corresponding movement of the rod 15', the collar 25' engaging collar 14' thereby causing the rod 15' to rock lever 21 and the tool carrier, through link 23, as shown in Fig. 5, thus raising the tool upwardly and out of engagement with the plate P. As the rear end of rod 3' approaches and then passes dead center on its downward movement, rod 15' is lowered, effecting forward movement of the upper end of lever 21 and therethrough link 23, so as to move the lower end of the tool carrier rearwardly and against the abutment 11' of the head 5'. The spring 24 during movement of rod 3' on its working stroke is compressed, thereby moving and holding the tool carrier firmly against abutment 11'.

What is claimed is:—

1. In a planing machine, a work table, a carrier slidably supported above said table, a tool holder pivotally secured to the carrier and having its upper end terminating above said carrier, actuating means, a pitman connecting the actuating means and carrier, a yoke pivoted intermediate the ends of the pitman, and a rod having one end pivoted to the upper end of the tool holder and its opposite end slidably supported by said yoke, whereby to rock the tool out of engagement with the work upon movement of the carrier in one direction.

2. In a planing machine, a work table, a movable carrier overlying said table and formed with a stop, a tool holder pivotally secured to the carrier adjacent said stop and having its upper end terminating above said carrier, actuating means, a pitman connecting the actuating means and carrier, a vertically extending yoke pivoted intermediate the ends of the pitman, a rod having one end secured to the upper end of the tool holder and its opposite end slidably supported by said yoke, and spring means on said rod intermediate the upper end of the tool holder and yoke whereby to urge said holder against said stop when the carrier is reciprocated in one direction.

3. In a planing machine, a work table, a movable carrier overlying said table, a tool holder pivoted intermediate its ends to said carrier, actuating means, a pitman connecting the actuating means and carrier, a pivoted yoke secured intermediate the ends of the pitman, a rod having one end secured to the tool holder and its opposite end slidably supported by said yoke, and spring means carried by said rod intermediate the yoke and tool holder to normally urge the latter into engagement with the work when the carrier is moved in one direction.

In testimony whereof I affix my signature.

WALKER W. McCARROLL.